United States Patent
Malnati

(10) Patent No.: US 10,771,366 B2
(45) Date of Patent: Sep. 8, 2020

(54) DATA RATE MONITORING TO DETERMINE CHANNEL FAILURE

(71) Applicant: James R Malnati, Stillwater, MN (US)

(72) Inventor: James R Malnati, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 568 days.

(21) Appl. No.: 14/017,370

(22) Filed: Sep. 4, 2013

(65) Prior Publication Data

US 2015/0067145 A1    Mar. 5, 2015

(51) Int. Cl.
*H04L 12/26* (2006.01)
*H04L 12/24* (2006.01)

(52) U.S. Cl.
CPC ...... *H04L 43/0894* (2013.01); *H04L 41/0677* (2013.01); *H04L 43/16* (2013.01)

(58) Field of Classification Search
CPC ... H04L 1/0091; H04L 25/0262; H04L 25/01; H04L 25/25; H04L 41/0677; H04L 43/0894; H04L 43/16
See application file for complete search history.

(56) References Cited

U.S. PATENT DOCUMENTS

| | | | | |
|---|---|---|---|---|
| 6,002,871 A * | 12/1999 | Duggan | .............. | G06F 11/3664 714/38.12 |
| 2004/0044764 A1* | 3/2004 | Padmanabhan et al. | ..... | 709/224 |
| 2004/0153630 A1* | 8/2004 | Henry | ................ | G06F 9/30145 712/209 |
| 2009/0122716 A1* | 5/2009 | Hayashi | .............. | H04L 41/0896 370/252 |
| 2011/0078108 A1* | 3/2011 | Kumar | ................ | G06F 16/2471 707/602 |
| 2012/0005332 A1* | 1/2012 | Beattie, Jr. | .......... | H04L 43/0882 709/224 |
| 2012/0329401 A1* | 12/2012 | Wegmann | ........... | H04L 41/0803 455/67.11 |
| 2013/0035125 A1* | 2/2013 | Lee | ........................ | H04W 16/14 455/509 |
| 2013/0151689 A1* | 6/2013 | GanapathyRaj | .... | H04L 41/0806 709/224 |
| 2013/0155882 A1* | 6/2013 | Pendleton | ........... | H04L 43/0882 370/252 |
| 2013/0166774 A1* | 6/2013 | Pruthi et al. | ................... | 709/240 |
| 2017/0168913 A9* | 6/2017 | Johnson, Jr. | ......... | G06F 11/3466 |

* cited by examiner

*Primary Examiner* — Tonia L Dollinger
*Assistant Examiner* — Jihad K Boustany

(57) ABSTRACT

Data channels of a computer system may be remotely monitored to detect data channel degradation. A monitoring agent on a client may execute script commands on the remote computer system to monitor input/output (I/O) rates of a set of channels. The monitoring agent may compute an average data rate of the data channels and compare the I/O rate of each channel to the average. When the I/O rate of a channel falls below the average by at least a threshold amount, an alert may be generated to indicate to an administrator a possible failure with the data channel.

17 Claims, 5 Drawing Sheets

DATA RATE MONITORING TO DETERMINE CHANNEL FAILURE

FIELD OF THE DISCLOSURE

The instant disclosure relates to computer networks. More specifically, this disclosure relates to monitoring of computer systems on a computer network.

BACKGROUND

Computer systems, and servers in particular, form an information backbone upon which companies now rely on almost exclusively for data storage, data mining, and data processing. These systems are indispensable for the improved efficiency and accuracy at processing data as compared to manual human processing. Furthermore, these systems provide services that could not be realistically accomplished by human processing. For example, some computer systems execute physical simulations in hours that would otherwise take decades to complete by human computations. As another example, some computer systems store terabytes of data and provide instantaneous access to any of the data, which may include records spanning decades of company operations.

Monitoring these computers systems is a top priority for their operators and administrators to ensure that the computer systems are continuously available without interruption. These computer systems may demonstrate a coming problem, but if certain parameters of the computer system are not monitored, the corning problem may not be recognized in time for an administrator to take corrective action before a complete failure. For example, data channels in a computer system may experience a reduction in data rate prior to a complete failure of the data channel. However, conventionally there is no monitoring of the data channel data rate. Only after a complete failure would an administrator be alerted to a problem with the data channel, Even then, the administrator would likely not be aware of a problem until several users complained of the data channel failure. Waiting for a total failure of the data channel before taking corrective action causes downtime during which the data channel was unavailable and users were unable to access data.

SUMMARY

Computer systems, such as servers, may be monitored through a script engine executed on a client computer system remote from the servers. The computer system may execute a different operating system than the operating system executing on the server. The monitor may communicate with the server, issue scripts for execution on the server, parse results received from the server, and detect and/or correct conditions on the server that may lead to a failure.

Monitoring may be programmed once and deployed to any number of systems. The monitoring may continue 24 hours a day, 7 days a week, 365 days a year. In one embodiment, the monitoring may be performed by agentless monitoring. Unlike agents that consume memory, CPU, and disk space in their monitoring efforts, agentless monitoring is achieved at the cost of only a single additional (simulated) user on the target system. Commands submitted are those implemented by the primary system vendor, so customized programs need not me written and maintained. This further reduces monitoring cost and leads to a robust solution that may be evolved over time as needs change. Automated, agentless monitoring has very low impact (footprint) on the system as commands are submitted and the results examined.

One example of the monitoring includes detection of hardware degradation by monitoring data rates on data channels. Data channels connect a central processor to data sources, such as internal hard drives, internal solid state storage devices, external hard drives, external solid state storage devices, external tape drives, and/or other servers. When a hardware component begins to degrade, either the central processor, the storage device, or a bus processor between the central processor and the storage device, the data rate on the data channel decreases over time until a complete failure of the data channel. Previously, no human operator could repeatedly submit the commands necessary, perform the calculations required, and alert an administrator about the degradation of a data channel. Outright failure would occur before any problem was detected. Periodic console commands may be issued by an agentless monitor to probe a set of channels, average the combined data rates, and compare each channel in turn to this average actual rate. A degraded channel may thereby be identified, when its data rates are much lower than the others. Then, that data channel may be repaired or replaced. Automated detection flags a data channel problem within minutes of poor performance.

In one embodiment, the monitoring may be performed by generalized, modular code, which executes recursively through a list of channel names that need only be defined once within the compiled source code. This allows for easy maintenance when channel names change over time by allowing a simple mechanism to update their names within the code. To present an open-ended list of channel names to the code module, recursive list processing is employed using, for example, a simple pattern-matching language (SP-AMS). SP-AMS may be activated through use of a special Attribute Change Event Report, which may be implemented as a service and which may generate Message Event Reports in response to the Attribute Change Event Report. This processing may be implemented, in one embodiment, as an extension to the Shared Object Manager Application (SOMA), described in U.S. Pat. No. 6,154,787, which is hereby incorporated by reference. The SOMA may receive an Attribute Change Event Report of channels to examine (minus the channel currently being processed) from the channel monitoring solution and present a reduced list back to the solution as a Message Event Report. This SOMA-generated Message Event Report may appears as a typical console message to SP-AMS without causing disruption to normal console traffic. The effect is to recursively process all channel names, with the recursion being terminated after the last channel has been processed. Adding recursion to SP-AMS allows for elegant solution development, ease of maintenance, and may be applied to many other solutions in the future.

In one embodiment, channel data rates are expressed as large, 32-bit unsigned integers (e.g., 0 to 4294967296), but SP-AMS integer variables may only store 16-bit signed integers (e.g., −32768 to 32768). To accommodate data structures unable to store large-valued channel data rates an average of the accumulated data rates of all channels may be compared to each channel's individual data rate and any channel with data rates far enough below this constantly-updated average may be flagged as potentially degraded. As the data rate disparity grows, the alert may be escalated and the alert's visibility enhanced by external notification, such as a text message or email message, 32-bit integers may be treated as string values and calculations performed by positive integer conversion to exploit a subtle effect in the storage of integers that allows for much larger numbers to be held in SP-AMS integer variables, such as when strings converted to unsigned integers are not handled the same way internally as 16-bit signed integers. This is one example of a method to allow 32-bit unsigned arithmetic on channel data rates within SP-AMS.

According to one embodiment, a method may include measuring, by a monitoring agent, a data rate of a set of channels for communication by a remote computer. The method may also include calculating, by the monitoring agent, an average data rate for the set of channels. The method may further include determining, by the monitoring agent, whether any channel of the set of channels is below a threshold amount in reference to the calculated average data rate. The method may also include generating, by the monitoring agent, an alert for a data channel when the data channel is determined to be below the calculated average data rate by the threshold amount.

According to another embodiment, a computer program product may include a non-transitory computer readable medium. The medium may include code to perform the step of measuring a data rate of a set of channels for communication by a remote computer. The medium may also include code to perform the step of calculating an average data rate for the set of channels. The medium may further include code to perform the step of determining whether any channel of the set of channels is below a threshold amount below the calculated average data rate. The medium may also include code to perform the step of generating an alert for a data channel when the data channel is determined to be below the calculated average data rate by the threshold amount.

According to yet another embodiment, an apparatus may include a memory and a processor coupled to the memory. The processor may be configured to execute the step of measuring a data rate of a set of channels for communication by a remote computer. The processor may also be configured to perform the step of calculating an average data rate for the set of channels. The processor may further be configured to perform the step of determining, by the monitoring agent, whether any channel of the set of channels is below a threshold amount in reference to the calculated average data rate. The processor may also be configured to perform the step of generating an alert for a data channel when the data channel is determined to be below the calculated average data rate by the threshold amount.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
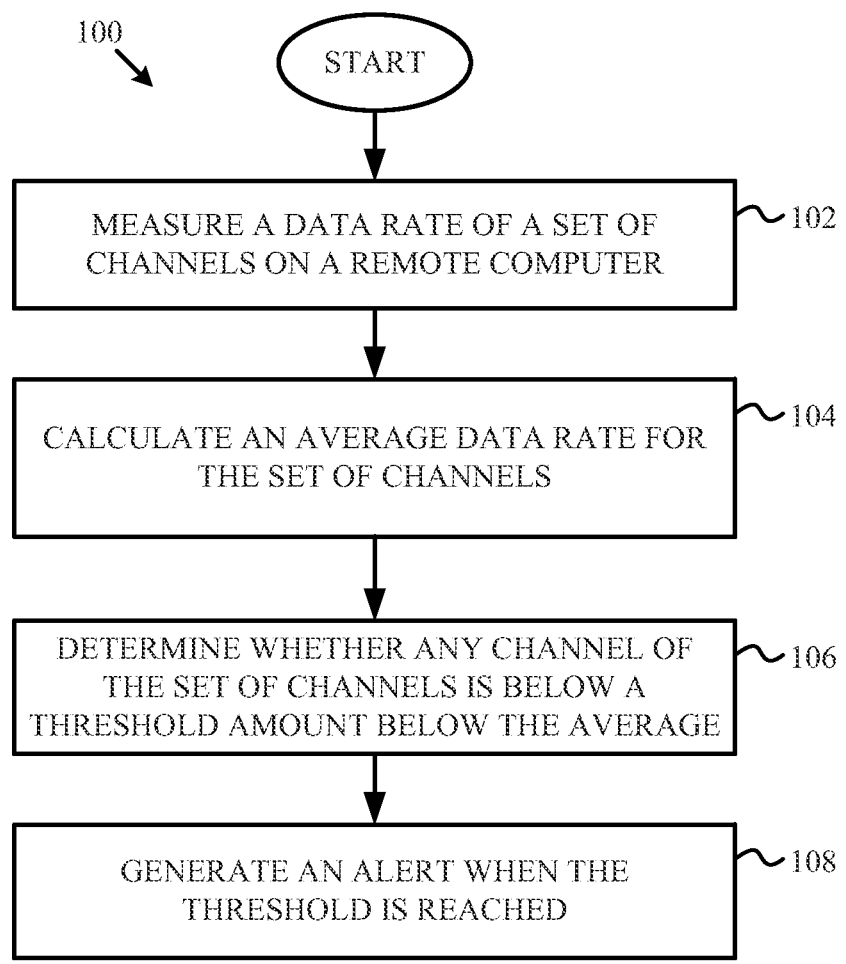
FIG. 1 is a flow chart illustrating a method of monitoring data channel data rates according to one embodiment of the disclosure.

FIG. 1 is a flow chart illustrating a method of monitoring data channel data rates according to one embodiment of the disclosure. A method 100 begins at block 102 with measuring a data rate of each channel of a set of channels on a remote computer. For example, a monitoring agent may initiate a communications session to a remote computer and execute script commands to obtain the data rates of a set of channels on the remote computer. At block 104, an average data rate may be calculated for the set of channels. Then, at block 106, it is determined whether any channel of the set of channels is below a threshold amount below the calculated average. For example, if the calculated average for the set of channels is 1.0 Mb/s and the threshold is 500 kb/s, then any channel with a data rate below 500 kb/s may be flagged for an alert. At block 108, an alert is generated for any channel flagged at block 106. The alert may include, for example, a text message or an email to one or more administrators.

Figure 2:
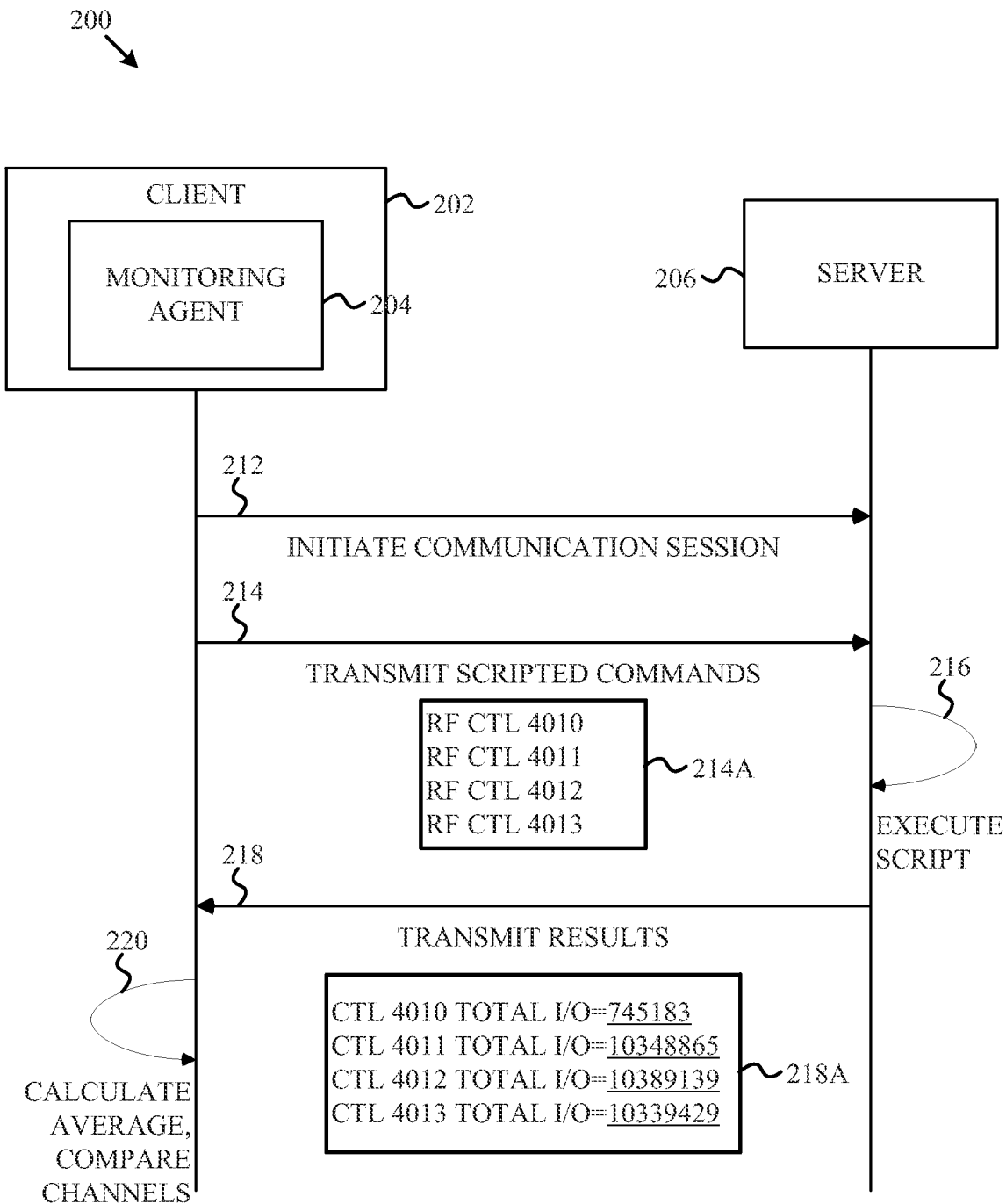
FIG. 2 is a call diagram illustrating agentless monitoring of data channel data rates according to one embodiment of the disclosure.

FIG. 2 is a call diagram illustrating agentless monitoring of data channel data rates according to one embodiment of the disclosure. A monitoring agent 204 may execute on a client 202. The client 202 may host a number of monitors, such as by executing each monitor in a hosted environment. The monitor 204 may initiate a communication session with a server 206 at call 212. At call 214, scripted commands are transmitted to the server 206. One set of example scripted commands for measuring data rates is illustrated in script 214A. The scripted commands may be selected from sets of scripted commands programmed into the monitor and set to execute at specific times or specific intervals based, at least in part, on the computer name or computer type of the server 206. At call 216, the server 206 executes the scripted commands. The scripted commands may be executed, for example, through a simulated user on the server 206. Executing through a simulated user allows the scripted commands to be executed on the server 206 without any additional software loaded on the server 206. At call 218, results from the scripted commands are transmitted from the server 206 to the monitor 204. One set of example results is illustrated in results 218A. The monitor 204 then calculates an average and compares the channels to the average for determining whether to generate an alert for a data channel at call 220.

Figure 3:
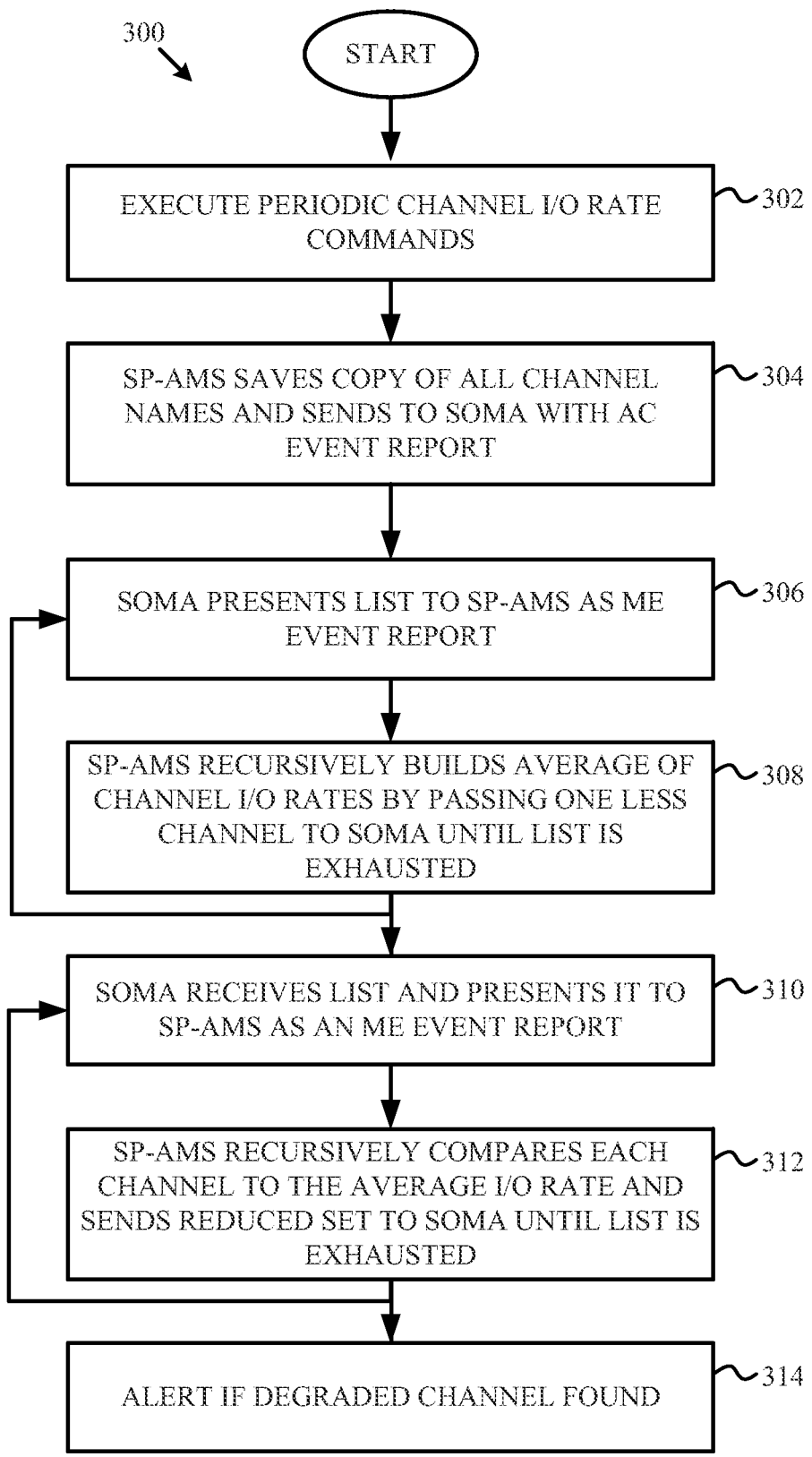
FIG. 3 is a flow chart illustrating monitoring data channel data rates with recursion according to one embodiment.

FIG. 3 is a flow chart illustrating monitoring data channel data rates with recursion according to one embodiment. A method 300 begins at block 302 with executing periodic channel input/output (I/O) rate commands on the remote computer to monitor a set of channels. At block 304, SP-AMS receives the results of the rate commands at block 302 and saves a copy of all channel names and sends the channel names to SOMA with an AC Event Report. Then, at block 306, SOMA presents the channel list to SP-AMS as an ME Event Report. At block 308, SP-AMS recursively builds an average data rate for the set of channels by passing one less channel to SOMA until the channel name list is exhausted. At block 310, SOMA receives the channel list and presents it to SP-AMS as an ME Event Report. Then, at block 312, SP-AMS recursively compares each channel to the average I/O rate and sends a reduced set to SOMA until the list is exhausted. At block 314, an alert is generated if a degraded channel is found, indicated by an I/O rate below the average by at least a threshold amount.

Figure 4:
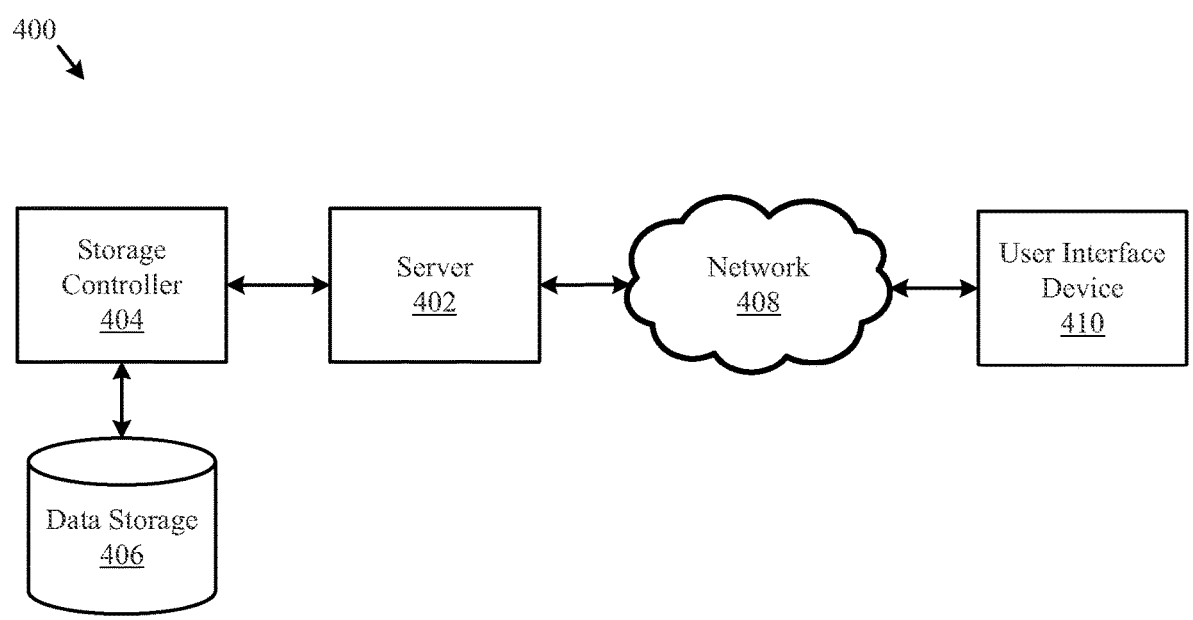
FIG. 4 is a block diagram illustrating a computer network according to one embodiment of the disclosure.

FIG. 4 illustrates one embodiment of a system 400 for an information system, including a system for agentless monitoring of data channels. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface for specifying the threshold for alerts or viewing I/O rates for data channels.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
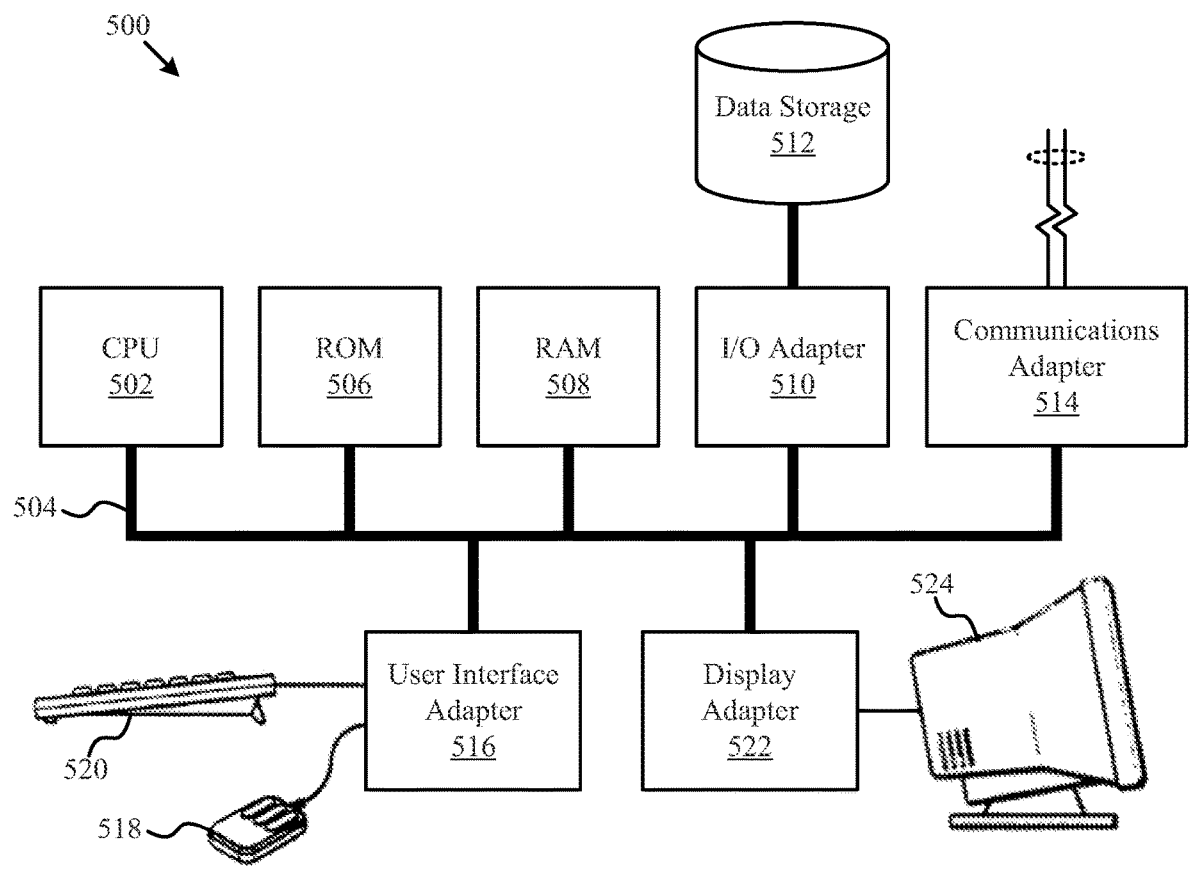
FIG. 5 is a block diagram illustrating a computer system according to one embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   measuring, by a client monitoring agent residing on a client computing device, a data rate of a set of channels on a remote server, wherein the step of measuring the data rate comprises;
     initializing a communication session with the remote server;
     transmitting, through the communication session, channel data rate commands for each of a plurality of channels in a set of channels to the remote server for execution, wherein the channel data rate commands are generated by a client script engine, each of the channel data rate commands specifying at least one time period for the channels in the set of channels for measuring data rate; and
     receiving, through the communication session, the data rate of each of the channels in the set of channels, in response to the channel data rate commands;
     storing the data rate of each channel of the set of channels in a respective string variable,
     wherein the client monitoring agent executes instructions on the client computing device;
   calculating, by the client monitoring agent, an average data rate for the channels in the set of channels, wherein the calculating comprises performing 32-bit unsigned arithmetic on the string variables;
   determining, by the client monitoring agent, whether any channel of the set of channels is below a threshold amount below the calculated average data rate; and
   generating, by the client monitoring agent, an alert for a data channel when the data channel is determined to be below the calculated average data rate by the threshold amount.

2. The method of claim 1, further comprising:
   determining, by the client monitoring agent, whether the data channel is below a second larger threshold amount below the calculated average data rate; and
   generating, by the client monitoring agent, a second alert of higher severity when the data channel is determined to be below the calculated average data rate by the second threshold amount.

3. The method of claim 1, further comprising receiving, by the client monitoring agent, a list of channel names corresponding to the set of channels.

4. The method of claim 1, further comprising:
   transmitting periodic channel input/output (I/O) rate commands;
     wherein the step of calculating the average data rate comprises recursively comparing each data rate for the set of channels to the calculated average data rate.

5. The method of claim 1, in which the alert is at least one of an email message and a text message.

6. A computer program product, comprising:
   a non-transitory computer-readable medium of a client computing device comprising code of a client monitoring agent to reside on the client computing device to perform the steps of:
     measuring a data rate of a set of channels on a remote server, wherein the step of measuring the data rate comprises:
       initializing a communication session with the remote server;
       transmitting, through the communication session, channel data rate commands for each of a plurality of channels in a set of channels to the remote server for execution, wherein the channel data rate commands are generated by a client script engine, each of the channel data rate commands specifying at least one time period for the channels in the set of channels for measuring data rates;
       receiving, through the communication session, the data rate of the channels in the set of channels, in response to the channel data rate commands;
       storing the data rate of each channel of the set of channels in a respective string variable;
       wherein the client monitoring agent executes instructions on the client computing device;
     calculating an average data rate for the channels in the set of channels, wherein the calculating comprises performing 32-bit unsigned arithmetic on the string variables;
     determining whether any channel of the set of channels is below a threshold amount below the calculated average data rate; and
     generating an alert for a data channel when the data channel is determined to be below the calculated average data rate by the threshold amount.

7. The computer program product of claim 6, in which the medium further comprises code to perform the steps of:
   determining whether the data channel is below a second larger threshold amount below the calculated average data rate; and
   generating a second alert of higher severity when the data channel is determined to be below the calculated average data rate by the second threshold amount.

8. The computer program product of claim 6, in which the medium further comprises code to perform the step of receiving a list of channel names corresponding to the set of channels.

9. The computer program product of claim 6, further comprising:
transmitting periodic channel input/output (I/O) rate commands;
wherein the step of calculating the average data rate comprises recursively comparing each data rate for the set of channels to the calculated average data rate.

10. The computer program product of claim 6, in which the alert is at least one of an email message and a text message.

11. An apparatus, comprising:
a memory; and
a processor of a client computing device coupled to the memory, wherein the processor is configured to perform the steps of a client monitoring agent residing on the client computing device:
measuring a data rate of a set of channels on a remote server, wherein the step of measuring the data rate comprises:
initializing a communication session with the remote server;
transmitting, through the communication session, channel data rate commands for each of a plurality of channels in a set of channels to the remote server for execution, wherein the channel data rate commands are generated by a client script engine, each of the channel data rate commands specifying at least one time period for the channels in the set of channels for measuring data rates; and
receiving, through the communication session, the data rate of each of the channels in the set of channels, in response to the channel data rate commands,
storing the data rate of each channel of the set of channels in a respective string variable;
wherein the client monitoring agent executes instructions on the client computing device;
calculating an average data rate for the channels in the set of channels, wherein the calculating comprises performing 32-bit unsigned arithmetic on the string variables;
determining whether any channel of the set of channels is below a threshold amount below the calculated average data rate; and
generating an alert for a data channel when the data channel is determined to be below the calculated average data rate by the threshold amount.

12. The apparatus of claim 11, in which the processor is further configured to perform the steps of:
determining whether the data channel is below a second larger threshold amount below the calculated average data rate; and
generating a second alert of higher severity when the data channel is determined to be below the calculated average data rate by the second threshold amount.

13. The apparatus of claim 11, in which the processor is further configured to perform the step of receiving a list of channel names corresponding to the set of channels.

14. The apparatus of claim 11, further comprising:
transmitting periodic channel input/output (I/O) rate commands;
wherein the step of calculating the average data rate comprises recursively comparing each data rate for the set of channels to the calculated average data rate.

15. The method of claim 1, wherein the channel data rate command is executed by a simulated user on the remote server.

16. The computer program product of claim 6, wherein the channel data rate command is executed by a simulated user on the remote server.

17. The apparatus of claim 13, wherein the channel rate command is executed by a simulated user on the remote server.

* * * * *